No. 620,379. J. F. THEURER. Patented Feb. 28, 1899.
PROCESS OF AND APPARATUS FOR FILTERING AND RECARBONATING BEER.
(Application filed Mar. 11, 1898.)
(No Model.) 2 Sheets—Sheet 1.

No. 620,379. J. F. THEURER. Patented Feb. 28, 1899.
PROCESS OF AND APPARATUS FOR FILTERING AND RECARBONATING BEER.
(Application filed Mar. 11, 1898.)

(No Model.) 2 Sheets—Sheet 2.

Attest:
C. C. Burdine
D. E. Burdine

Inventor;
Jacob F. Theurer,
by Dodge and Sons,
Attys

UNITED STATES PATENT OFFICE.

JACOB F. THEURER, OF MILWAUKEE, WISCONSIN.

PROCESS OF AND APPARATUS FOR FILTERING AND RECARBONATING BEER.

SPECIFICATION forming part of Letters Patent No. 620,379, dated February 28, 1899.

Application filed March 11, 1898. Serial No. 673,536. (No model.)

*To all whom it may concern:*

Be it known that I, JACOB F. THEURER, a citizen of the United States, residing at Milwaukee, in the county of Milwaukee and State of Wisconsin, have invented certain new and useful Improvements in Processes of and Apparatus for Filtering and Recarbonating Beer, of which the following is a specification.

My present invention relates to an improved process of filtering and recarbonating beer, all of which will be hereinafter fully set forth, reference being had to the annexed drawings, wherein—

Figure 1:
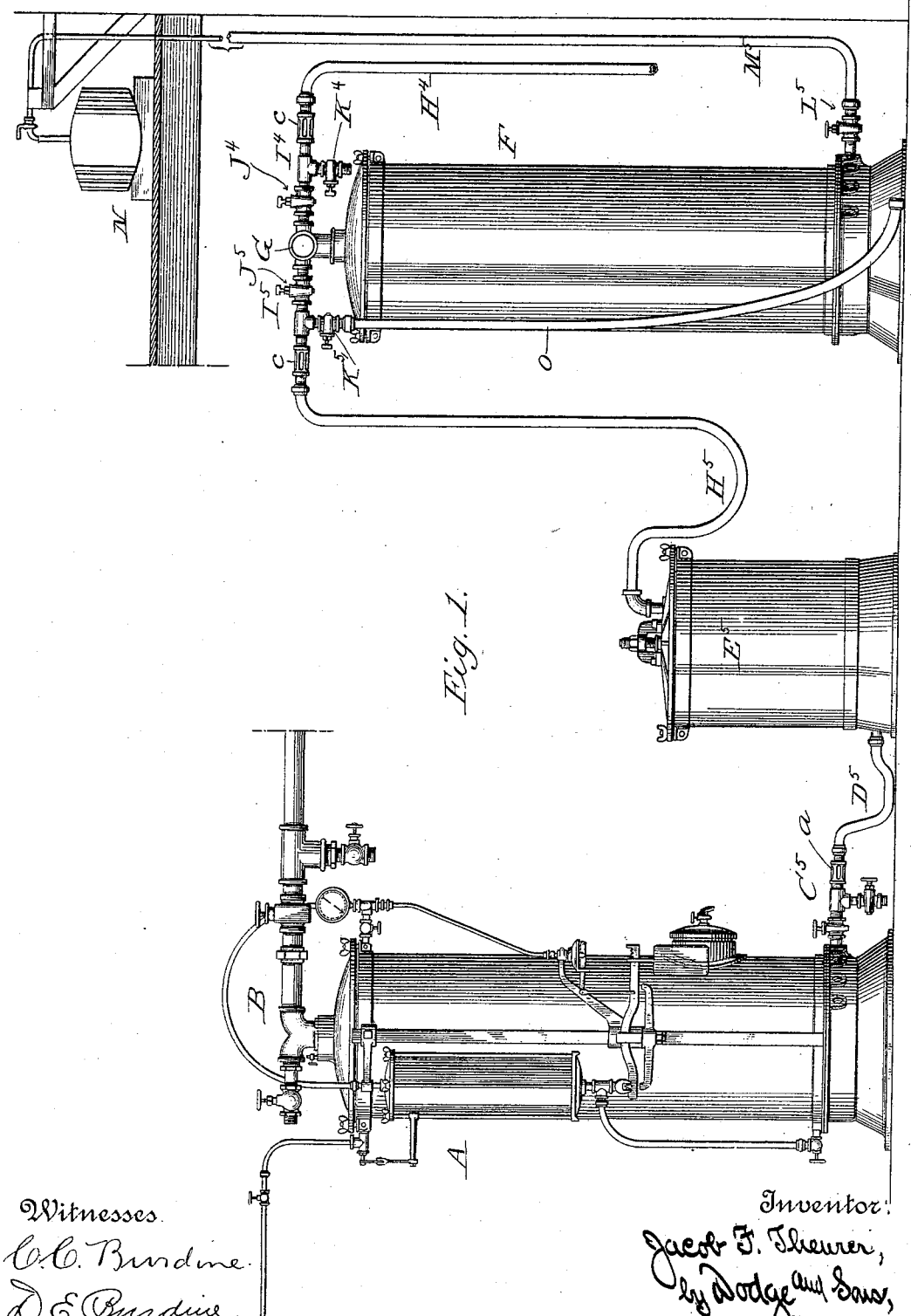
Figure 2:
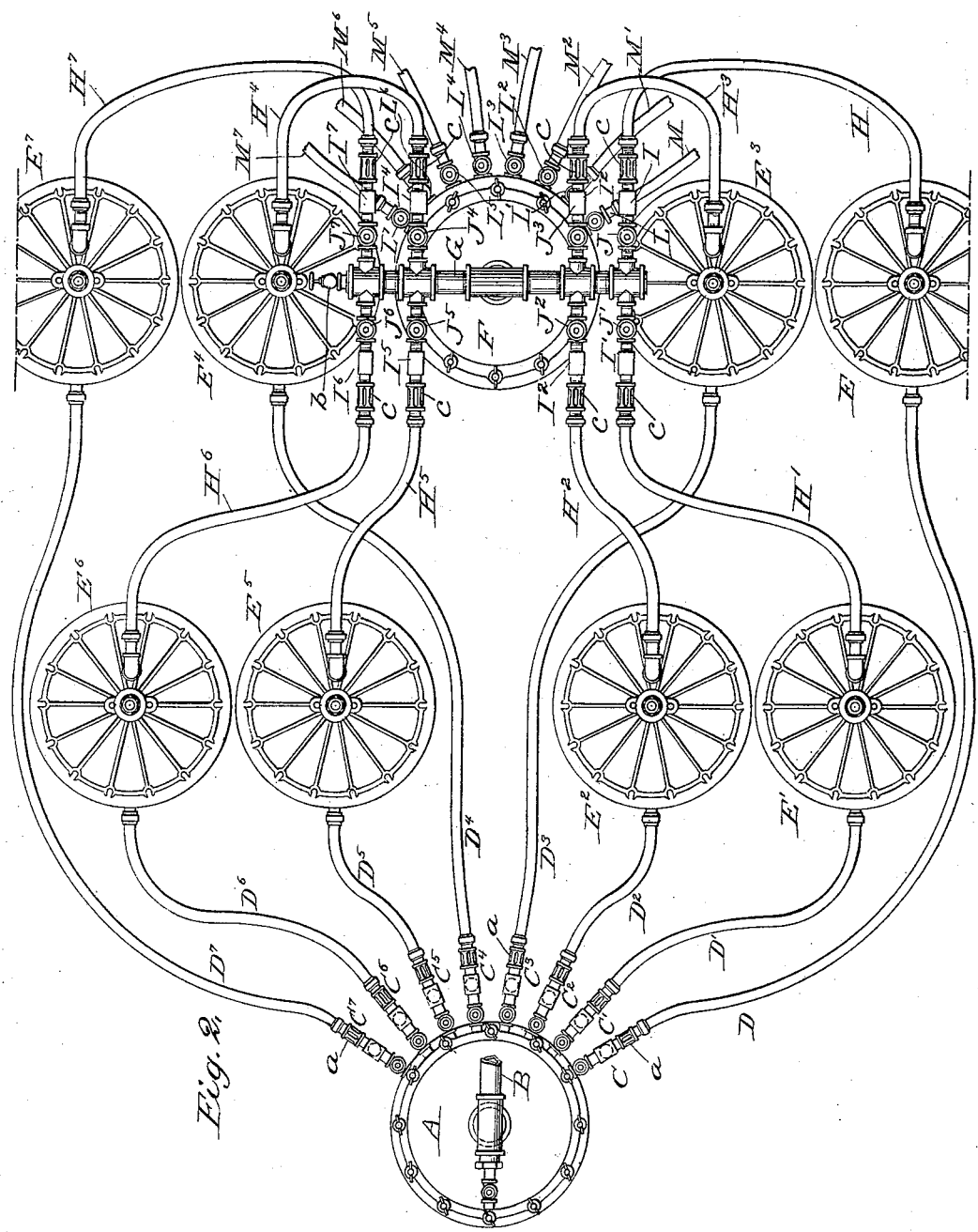

Figure 1 is a side elevation of the apparatus; and Fig. 2, a top plan view of the carbonator, the filters, the recarbonator, and the various connections between the parts.

The object of the present invention is to so arrange the various parts of the apparatus that the beer may flow from the carbonator through one of a series of filters and that the filtered beer and freed or liberated gas may thence flow together into a recarbonator, where the gas is reabsorbed, and finally to pass the brilliant and pure beer from the recarbonator into the packages at the racking-bench.

It has been found that in passing the beer through a hard compact filter mass quite a percentage of the gas is liberated and the harder and more efficient the filtering-body the greater the amount of gas freed. It is necessary to a proper working of the filter that the gas should not remain therein, and it is also necessary to a proper product that the gas which has been abstracted should be again absorbed or redissolved by the beer or at least that the beer should have the requisite amount of gas. Heretofore the gas has been withdrawn directly from the filters independently of the beer; but this method is wasteful and unsatisfactory in many regards, necessitating the recarbonation of the beer from other sources.

Referring to the drawings, A indicates a carbonator, and B the inlet thereto, which preferably leads from the beer-cellars. The carbonator may be of any approved type and is provided at or near the bottom with a series of valved outlets C, C', $C^2$, $C^3$, $C^4$, $C^5$, $C^6$, and $C^7$. (Shown most clearly in Fig. 2.)

These outlets are connected through suitable pipe or hose connections D, D', $D^2$, $D^3$, $D^4$, $D^5$, $D^6$, and $D^7$ with a series of filters E, E', $E^2$, $E^3$, $E^4$, $E^5$, $E^6$, and $E^7$, lanterns $a$ being provided in said pipes for the purpose of inspection. The filters may be of any approved type.

F denotes the recarbonator, having an opening in its top which communicates with a manifold G, said manifold being provided with an air-valve $b$. The recarbonator consists in the form shown simply of a cylindrical chamber provided with a removable cover, which can be secured tightly to its seat. Each of the filters is connected to this manifold G through pipes or hose H, H', $H^2$, $H^3$, $H^4$, $H^5$, $H^6$, and $H^7$ and laterals I, I', $I^2$, $I^3$, $I^4$, $I^5$, $I^6$, and $I^7$, each of said laterals having a valve J, J', $J^2$, $J^3$, $J^4$, $J^5$, $J^6$, and $J^7$. Each connection is provided with a lantern $c$, and intermediate said lantern and the valves J, J', &c., the laterals are provided with a draw-off cock or valve, two of which, $K^4$ $K^5$, are shown in side elevation, Fig. 2.

Around the base of the recarbonator F there is provided a series of valved outlets L, L', $L^2$, $L^3$, $L^4$, $L^5$, $L^6$, and $L^7$, from which lead pipes or hose M, M', $M^2$, $M^3$, $M^4$, $M^5$, $M^6$, and $M^7$ to any suitable racking device or devices N.

Presuming that the apparatus is to be started, the attendant opens one of the cocks at the base of the carbonator A—say $C^5$—permitting the carbonated beer to flow through pipe or hose $D^5$ and into filter $E^5$, whence it passes through pipe $H^5$ to lateral $I^5$. The attendant closes valve $J^5$ and opens the waste or draw-off valve $K^5$, the beer passing therethrough into a hose O, by which it is led off to any desired point or receptacle. When the beer flows bright, as may be seen by an inspection thereof through lantern $c$, the lower end of hose O is connected to one of the series of valved outlets L L', &c., around the base of the recarbonator and the air-valve $b$ opened, the beer and ruptured gas then passing into the recarbonator and filling the same, the air-valve and the valve $K^5$ being closed when this is accomplished. Valve $K^5$ is now closed and valve $J^5$ opened, as is also one of the valved outlets L L', &c., the hose O having meanwhile been disconnected. The filtered beer and the gas which has been ruptured or freed therefrom by reason of the action of the filter now pass into the upper end of the recarbonator through the manifold G, the beer passing slowly down through said recarbonator, reabsorbing the carbonic-acid gas and passing to the racking devices brilliant and clear.

In practical use of the apparatus all the filters with the exception of one are brought into use, one being reserved for the purpose of taking the place of that one which has been longest in use and has become clogged with impurities abstracted from the passing beer. The filter which is thus displaced or thrown out of action is cleaned and supplied with a fresh filtering element and is then held in reserve to take the place of the next one needing attention. It will thus be seen that with the apparatus just described a continuous flow of beer may be maintained, and by the simple inspection of the lanterns c from time to time the condition of each filter may be readily determined and thrown out of action when necessary.

Instead of passing the beer through a carbonator such as shown it may be taken directly from the bunging-vats and delivered to the filters, the beer in such instance containing enough gas so that the step of carbonating is not necessary.

The term "carbonating-chamber" as it appears in the claims is to be read in a broad sense, as any device used for impregnating the beer may be employed. The recarbonating-chamber shown is merely illustrative, and while it is found to work well in practice I do not desire to limit myself to such structure, as any reimpregnating device in which the action above described takes place will suffice.

Having thus described my invention, what I claim is—

1. The process of treating beer, which consists in passing carbonated beer through a filter; leading the filtered beer and the gas ruptured therefrom to a recarbonating-chamber and therein causing the beer to reabsorb the gas, substantially as described.

2. The process of treating beer, which consists in passing carbonated beer through a filter; leading the filtered beer and the gas ruptured therefrom to a recarbonating-chamber; and finally withdrawing the beer from the lower end of the chamber, whereby the beer in its descent is caused to reabsorb the ruptured gas, substantially as described.

3. The process of treating beer, which consists in passing the beer through a carbonator; passing the carbonated beer through a filter; leading the filtered beer and the gas ruptured therefrom from the filter to a recarbonator and therein causing the beer to reabsorb the gas, substantially as described.

4. The process of treating beer, which consists in passing beer through a carbonator; passing the carbonated beer through a filter; leading the filtered beer and the gas ruptured therefrom from said filter to a recarbonator and therein causing the beer to reabsorb the abstracted gas; and finally drawing the beer from said recarbonator to a suitable racking device.

5. The process of treating beer, which consists in passing the beer through a carbonator; passing the carbonated beer through a filter; leading the filtered beer and the gas ruptured therefrom from said filter to a recarbonator; and finally withdrawing the beer from the lower part of said recarbonator and thereby causing the beer and gas to commingle and the beer to reabsorb the gas, substantially as described.

6. The process of treating beer, which consists in passing the beer through a carbonator; withdrawing the carbonated beer therefrom and passing it through all of a series of filters but one; leading the filtered beer and the ruptured gas from the working filters to a recarbonator; drawing the beer from the lower part of the recarbonator and thereby causing the beer to reabsorb the ruptured gas in its passage through said recarbonator; and finally cutting out the filter which first becomes clogged and replacing it by the one held in reserve; cleaning the clogged filter and substituting it for the next one needing cleaning, and so on throughout the series, substantially as described, whereby a constant flow of beer is maintained.

7. In an apparatus for treating beer, the combination of a carbonating-chamber; a filter connected thereto; a recarbonating-chamber connected to the opposite side of said filter by a suitable pipe leading to the upper end of the recarbonator; a draw-off interposed in said pipe intermediate the filter and the recarbonator, and valves controlling said draw-off, and the pipe leading into the recarbonator, substantially as described.

8. In an apparatus for treating beer, the combination of a carbonating-chamber; a series of valved outlets leading from the lower part of said chamber; a series of filters connected with said outlets; a recarbonator; a valved pipe leading from each of said filters and communicating with the upper part of the recarbonator; valved draw-offs interposed in said pipes between the filters and the recarbonator; and a series of valved outlets leading from the base of said recarbonator.

9. In an apparatus for treating beer, the combination of a carbonating-chamber; a series of valved outlets leading from the lower part of said chamber; a series of filters connected with said outlets; a recarbonator; a manifold G, mounted on the top of said recarbonator and provided with an air-valve; a series of valved laterals leading from said manifold; pipes H H', &c., connecting said laterals with the filters; and draw-offs and lanterns interposed in said pipes, substantially as described.

10. In an apparatus for treating beer, the combination of an impregnating device for the beer; a filter connected to and in communication therewith; and a reimpregnating device connected to the outlet of the filter, designed to receive the filtered beer and the ruptured gas, substantially as described.

In witness whereof I hereunto set my hand in the presence of two witnesses.

JACOB F. THEURER.

Witnesses:
A. H. WEIL,
EMIL BEST.